United States Patent
Budman et al.

[11] Patent Number: 5,540,597
[45] Date of Patent: Jul. 30, 1996

[54] ALL FLEX PCMCIA-FORMAT CABLE

[75] Inventors: Mark Budman, Vestal, N.Y.; Robert V. Jenness, Boca Raton, Fla.; Lloyd H. Massman, Delray Beach, Fla.; Joseph M. Mosley, Boca Raton, Fla.; Anthony D. Wutka, Coral Springs, Fla.

[73] Assignee: International Business Machines Corporation, Armonk, N.Y.

[21] Appl. No.: 167,712

[22] Filed: Dec. 15, 1993

[51] Int. Cl.⁶ .......................... H01R 31/00; H01R 11/00
[52] U.S. Cl. .................... 439/77; 439/493; 439/505
[58] Field of Search ............................ 439/505, 502, 439/77, 493

[56] References Cited

U.S. PATENT DOCUMENTS

| | | | |
|---|---|---|---|
| 3,737,833 | 6/1973 | Jerominek | 439/77 |
| 4,448,474 | 5/1984 | Melnychenko | 439/493 X |
| 4,489,999 | 12/1984 | Miniet | 439/493 X |
| 4,639,054 | 1/1987 | Kersbergen | 439/59 |
| 4,941,845 | 7/1990 | Eppley et al. | 439/505 |
| 5,183,404 | 2/1993 | Aldous et al. | 439/131 X |
| 5,244,397 | 9/1993 | Anhalt | 439/101 |
| 5,295,852 | 3/1994 | Renn et al. | 439/493 X |
| 5,302,947 | 4/1994 | Fuller et al. | 340/825.34 |
| 5,334,030 | 8/1994 | Brilliott | 439/75 |
| 5,343,319 | 8/1994 | Moore | 359/152 |
| 5,345,367 | 9/1994 | Pierce et al. | 362/32 |
| 5,375,037 | 12/1994 | Le Roux | 439/638 X |

FOREIGN PATENT DOCUMENTS 2-288176  11/1990  Japan ........................... 439/502

*Primary Examiner*—P. Austin Bradley
*Assistant Examiner*—Jeanne M. Elpel
*Attorney, Agent, or Firm*—Michael J. Buchenhorner

[57] ABSTRACT

A flexible cable assembly for coupling an electronic apparatus, having a port for receiving personal computer cards in accordance with the PCMCIA standard, to at least one peripheral device, said flex cable assembly comprises a personal computer card connector, in accordance with the PCMCIA standard, for connecting into a corresponding port in the electronic apparatus, and a flexible cable connected to the personal computer card connector. The personal computer card connector also comprises an interface to said at least one peripheral device. In accordance with a further aspect of the invention, the flex cable assembly can also couple a first electronic apparatus, to a second electronic apparatus, each having a port for receiving personal computer cards in accordance with the PCMCIA standard. This flex cable assembly comprises (1) a first PCMCIA card connector for connecting into a corresponding port in either the first or second electronic apparatus; (2) a second PCMCIA card connector for connecting into a corresponding port in either the first or second electronic apparatus; and (3) a flex cable coupled between the first and second personal computer card connectors.

5 Claims, 4 Drawing Sheets

ALL FLEX PCMCIA-FORMAT CABLE

TECHNICAL FIELD

This invention relates generally to personal computers, and more specifically to personal computers and more specifically, to connectors used for connecting personal computers to peripheral devices or to other personal computers.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard, or system planar, to electrically connect these components together. These systems are designed primarily to give independent computing capability to a single user and are inexpensively priced for purchase by individuals or small businesses. Examples of such personal computer systems are IBM's PERSONAL COMPUTER XT and AT and IBM's PERSONAL SYSTEM/2 Models 25, 30, 35, 40, 50, 5,5, 56, 57, 60, 65, 70, 80, 90, and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. Many Family I models have used the popular INTEL 8088 or 8086 microprocessor as the system processor. These processors have the ability to address one megabyte of memory. Certain Family I and most Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Such personal computers are characterized as having an "open" architecture. That is, the systems are designed and constructed in such a way that additional peripheral devices, such as removable media direct access storage devices (or DASD) may be selected and added to the systems, or an existing device may be changed for a device of a different type. Such peripheral devices may now take the form of pc cards, under the standard established by the Personal Computer Memory Card International Association (hereafter called, the PCMCIA standard). These pc cards may be classified under two general categories: memory cards and input/output (I/O) cards.

Memory cards were the first generation of cards specified by Release 1.0 of the PCMCIA standard. These cards are file-formatted and are used in substantially the same way as memory diskettes and hard disks. I/O cards are specified in Release 2.0 of the standard. These types of cards include modems, local area networks (LANs), image cards, hard disk drives, faxes, and docking stations. There are three physical sizes for these cards. All three types are 85.0 mm in length, and 54.0 mm in width. Type I are 3.3 mm in thickness; Type II are 5.0 mm; and TypeII, 10.5 mm.

The PCMCIA standard is becoming widely used for connecting peripheral devices to portable and notebook personal computers and may be used for other types of PCs. However, the existing packaging solutions call for connectors or connecting schemes as shown in FIG. 1.

Referring to FIG. 1, there is shown a personal computer system (pc) 10 coupled to a peripheral device 20, in a conventional manner. One end of a flexible cable 12 is connected to a PCMCIA card 14 via a connector 16. The other end of the flexible cable is connected to a printed circuit card 18 inside the peripheral device 20 via a connector 22. The PCMCIA card includes a connector (complying with the PCMCIA standard) that is used to mate with a port (also compliant with PCMCIA standard) inside the PC 10. This arrangement has the detriments of requiring unnecessary connectors and soldering.

In addition there exists a need for convenient, inexpensive, and reliable exchange of data between portable, notebook, or other similar types of computers. The methods currently used for this purpose include: (1) exchanging PCMCIA cards with data written and stored in them, and (2) connecting cable between the serial or parallel ports of two computers. The second approach suffers from the problem that some computers (e.g., palmtops) do not have a parallel port and the serial port is too slow. Additional inconvenience results from the relatively large size of parallel and serial ports, which would make the resulting connectors bulky, heavy, and inconvenient to store on the road.

SUMMARY OF THE INVENTION

Briefly, in accordance with the invention, a flexible cable assembly for coupling an electronic apparatus, having a port for receiving personal computer cards in accordance with the PCMCIA standard, to at least one peripheral device, said flex cable assembly comprises a personal computer card connector, in accordance with the PCMCIA standard, for connecting into a corresponding port in the electronic apparatus, and a flexible cable connected to the personal computer card connector. The personal computer card connector also comprises an interface to said at least one peripheral device.

In accordance with a further aspect of the invention, the flex cable assembly can also couple a first electronic apparatus, having a port for receiving personal computer cards in accordance with the PCMCIA standard, to a second electronic apparatus, also having a port for receiving personal computer cards in accordance with the PCMCIA standard. This flex cable assembly comprises (1) a first personal computer card connector, in accordance with the PCMCIA standard, for connecting into a corresponding port in either the first or second electronic apparatus; (2) a second personal computer card connector, also in accordance with the PCMCIA standard, for connecting into a corresponding port in either the first or second electronic apparatus; and (3) a flexible cable coupled between the first and second personal computer card connectors.

DESCRIPTION OF THE PREFERRED EMBODIMENT

Figure 1:
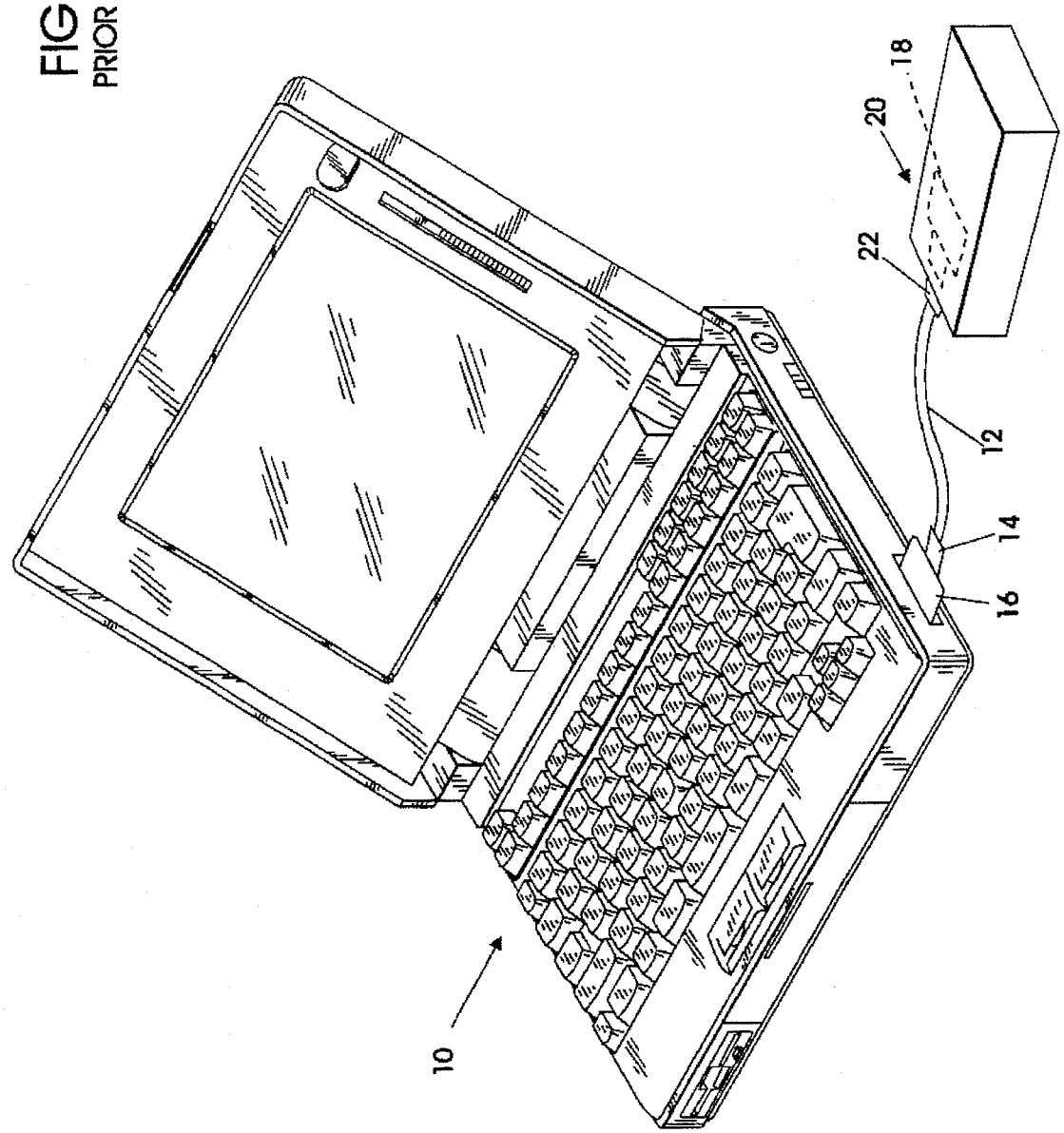
FIG. 1 shows a known connection scheme for a portable computer to a peripheral device.
Figure 2:
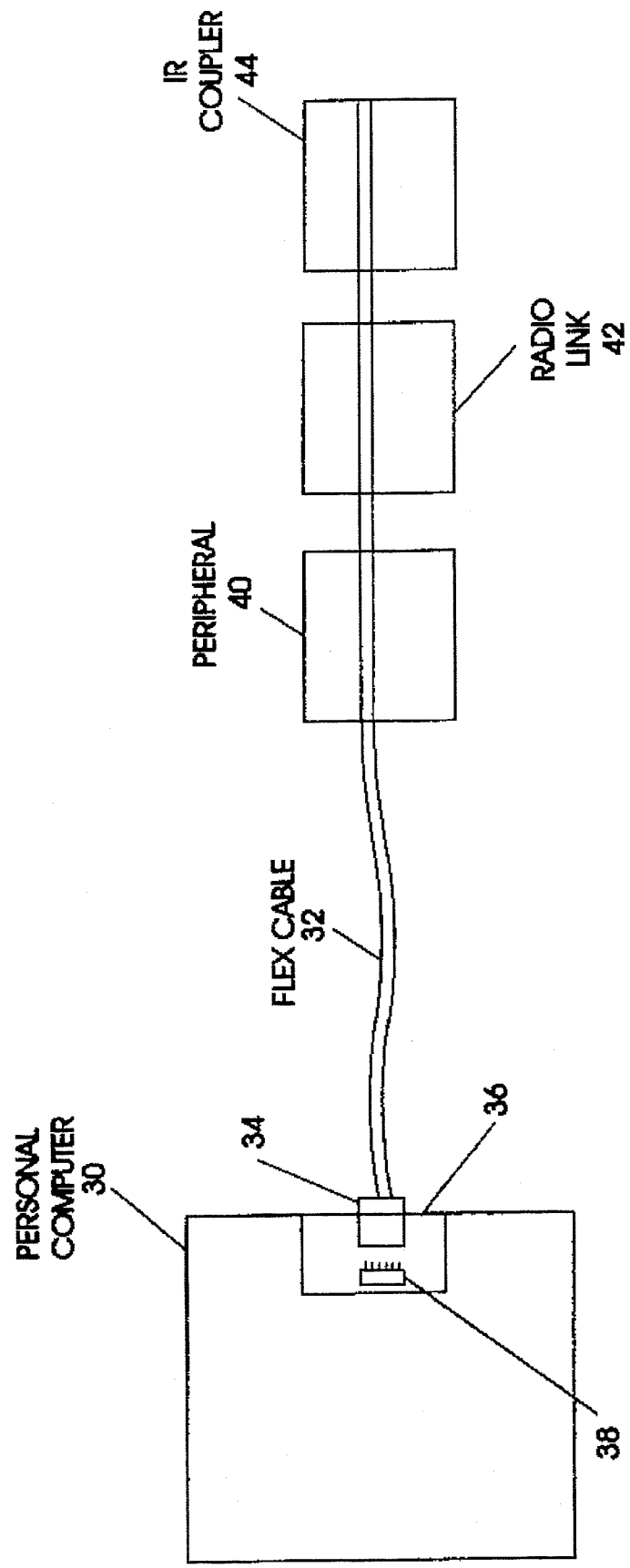
FIG. 2, shows a block diagram of a personal computer system coupled to peripheral devices, in accordance with the invention.

Referring to FIG. 2, there is shown a block diagram of a personal computer system 30 coupled to peripheral devices (40, 42, 44), in accordance with the invention. A flexible cable 32 with a standard PCMCIA connector 34 soldered onto it, carries all the electronic components of a PCMCIA card and that of the peripheral devices (40, 42, 44), in the same manner as the PCMCIA card 14 and the peripheral device card 18 did in the conventional package. Current technology allows the inclusion of the interface circuitry of the card 14, of FIG. 1, in the PCMCIA card connector housing, thus eliminating two connectors. The interface circuitry would include the data access arrangement (DAA) and the input/output circuitry for the peripheral devices. The connection between the connector 34 and the flex cable 32 can be made by means of a plurality of solder joints, each made between a wire in the cable and a corresponding conductor in the card. Being a single-piece carrier, this cable offers lower cost due to the elimination of the connectors (or solder assembly), lower weight, greater dynamic flexibility (which allows the adapting the package to the form factor most suitable for a given application), and better electrical properties due to elimination of the connectors.

The peripheral devices 42 and 44 could be a radio link and an infrared coupler, for example. These could be daisy-chained, limited only to the wireability of the flex cable 32 and functionality. A user could cut the flex cable 32 to any length desired according to the specific needs of the user. Moreover, the flex cable could be multi-layered to increase its wireability.

Figure 3:
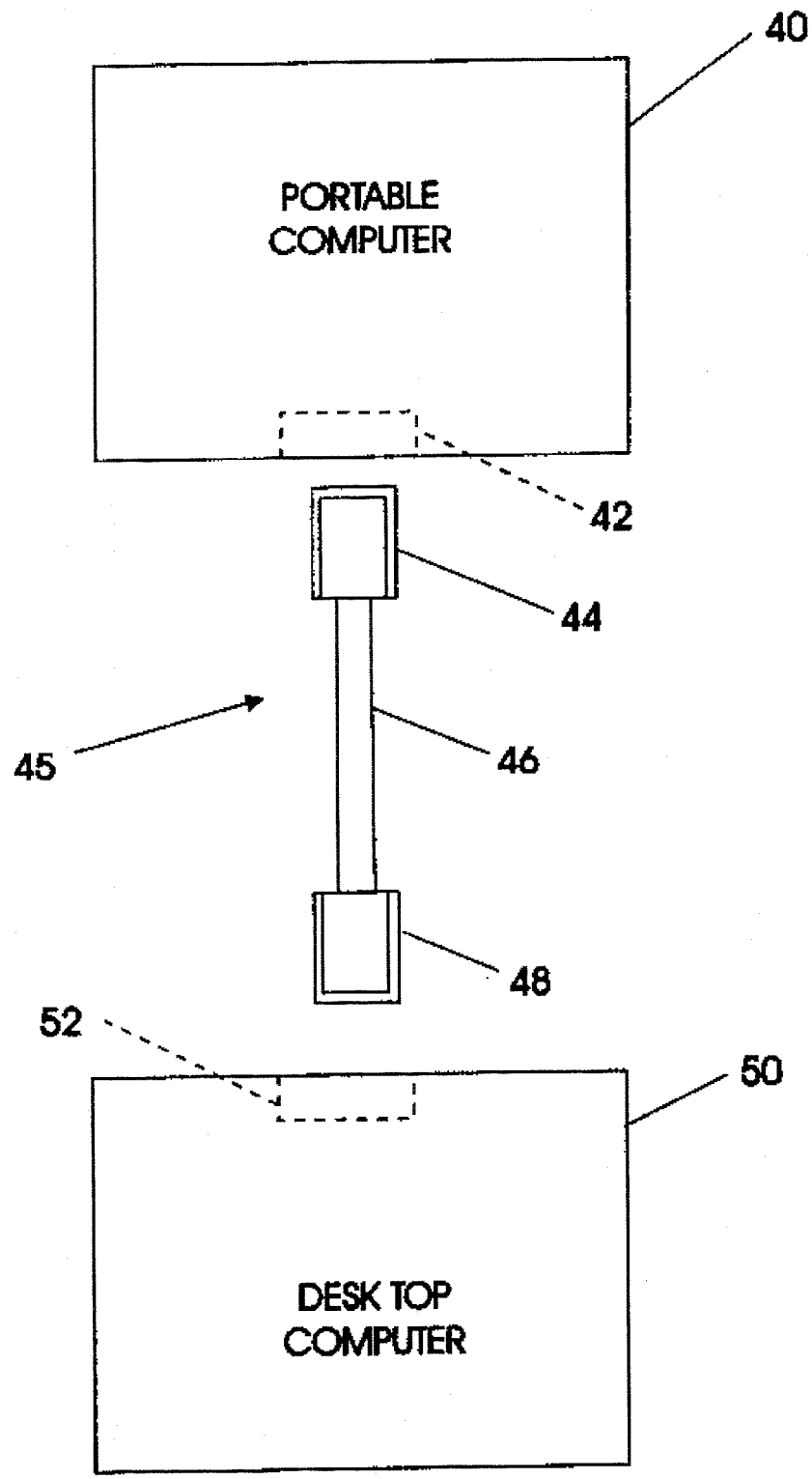
FIG. 3, shows a block diagram of a personal computer system coupled to another personal computer system, in accordance with the invention.

Referring now to FIG. 3, there is shown a block diagram of a portable personal computer system coupled to another personal computer system (e.g., a desktop), in accordance with another embodiment of the invention. In this arrangement PC cards 44 and 48 each include a connector in accordance with the PCMCIA standard. These cards are coupled to each other via a flex cable 46 which is connected (e.g., soldered) to the end of each PC card opposite its PCMCIA connector. These cards need not include any internal circuitry (i.e., they could be "blank" cards). The card 44 couples into the port 42 of portable computer 40 and the card 48 couples into the port 52 of the desktop computer 50. The computer receiving the data would "think" that it was reading data from a PCMCIA memory card.

The software required for this data transfer (similar to typical linking software currently available on the market) allows the data exchange between computers 40 and 50. Since PCMCIA cards are significantly smaller and lighter than parallel or serial port connectors, the whole data link cable assembly 45 is smaller and lighter. While not in use the cable assembly 45 can be folded onto itself, making it convenient to take on the road. Moreover, a blank PCMCIA card connector would provide a faster data transfer than would a serial port.

Figure 4:
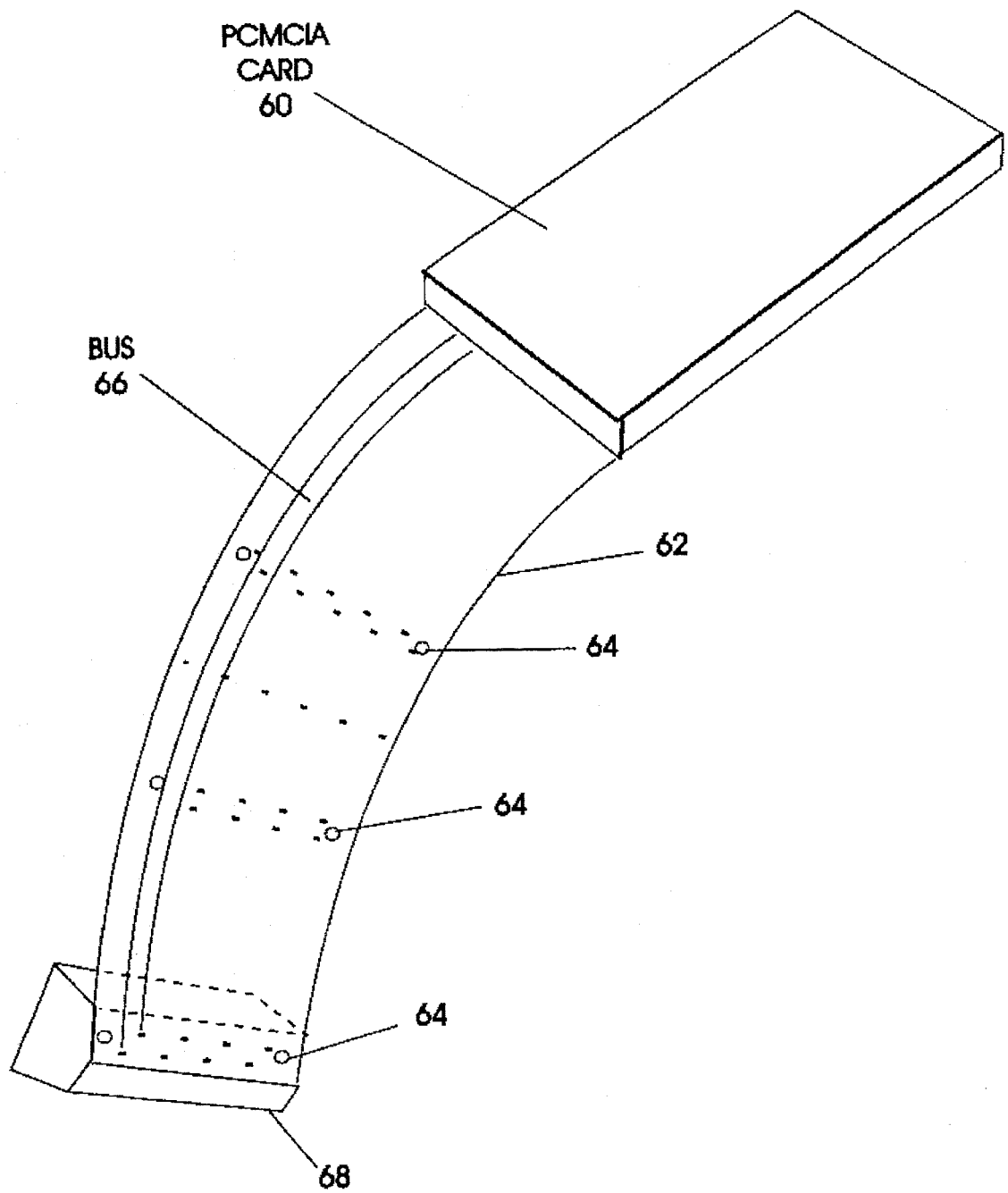
FIG. 4 shows a PCMCIA card connected to a peripheral.

Referring to FIG. 4, a PCMCIA card 60 connected to a peripheral 68 via a flex cable 62. Other peripherals can be connected to the flex cable at connection points 64. A bus 66 is common between the connection points.

What is claimed is:

1. A flexible cable assembly for coupling an electronic apparatus, having a port for receiving personal computer cards in accordance with the PCMCIA standard, to at least one peripheral device, not in accordance with the PCMCIA standard, said flexible cable assembly comprising:

a personal computer card connector, in accordance with the PCMCIA standard, for connecting into the port in the electronic apparatus; and a flexible cable having a first end directly connected to the personal computer card connector and having a second end for connecting to the at least one peripheral device;

said personal computer card connector also comprising an interface to said at least one peripheral device, said interface comprising a data access arrangement circuit.

2. The flexible cable assembly of claim 1, further comprising at least one peripheral device.

3. The flexible cable assembly of claim 2 wherein the at least one peripheral device is also a data processing system.

4. The flexible cable assembly of claim 1 wherein the flexible cable is connected to the personal computer card connector by means of a plurality of solder joints.

5. A flexible cable assembly for coupling a first computer system, having a port for receiving personal computer cards in accordance with the PCMCIA standard, to a second computer system, also having a port for receiving personal computer cards in accordance with the PCMCIA standard, said flexible cable assembly comprising:

a first personal computer card connector, in accordance with the PCMCIA standard, for connecting into the port in either the first or second computer system;

a second personal computer card connector, also in accordance with the PCMCIA standard, for connecting into the port in either the first or second computer system; and a flexible cable coupled between the first and second personal computer card connectors, said flexible cable attached directly to said first and second personal computer card connectors.

* * * * *